US012798359B2

(12) United States Patent
Eguchi

(10) Patent No.: US 12,798,359 B2
(45) Date of Patent: Nov. 17, 2026

(54) DUCT STRUCTURE OF VEHICLE

(71) Applicant: TOYOTA JIDOSHA KABUSHIKI KAISHA, Toyota (JP)

(72) Inventor: Takashi Eguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 246 days.

(21) Appl. No.: 18/738,331

(22) Filed: Jun. 10, 2024

(65) Prior Publication Data

US 2024/0416744 A1 Dec. 19, 2024

(30) Foreign Application Priority Data

Jun. 19, 2023 (JP) ................................ 2023-099873

(51) Int. Cl.
*B60K 11/06* (2006.01)
*B60K 1/04* (2019.01)

(52) U.S. Cl.
CPC ................ *B60K 11/06* (2013.01); *B60K 1/04* (2013.01)

(58) Field of Classification Search
CPC .... B60K 11/06; B60K 1/04; B60K 2001/005; B60K 2001/0422; B60K 2001/0427; B60K 2001/0433; B60K 2001/0438; H01M 10/625; H01M 10/613
See application file for complete search history.

(56) References Cited

U.S. PATENT DOCUMENTS

2021/0001715 A1* 1/2021 Henon ................ B60K 11/085

FOREIGN PATENT DOCUMENTS

| | | |
|---|---|---|
| JP | 2014-129039 A | 7/2014 |
| JP | 2016-068598 A | 5/2016 |
| JP | 2016-117450 A | 6/2016 |

* cited by examiner

*Primary Examiner* — Timothy Hannon
(74) *Attorney, Agent, or Firm* — Oliff PLC

(57) ABSTRACT

A duct structure of a vehicle includes: a duct having an air intake port opening toward an interior of the vehicle; and a sound absorbing member disposed in the duct, the duct has a bottom wall portion, the sound absorbing member is disposed to leave a gap between an inner surface of the bottom wall portion and the sound absorbing member, the inner surface of the bottom wall portion has a portion facing the gap and including a flow path forming portion forming a flow path portion and a reservoir forming portion forming a reservoir portion where liquid flowing through the flow path portion is stored, a distance between the reservoir forming portion and the sound absorbing member is larger than a distance between the flow path forming portion and the sound absorbing member, and a step is formed between the reservoir forming portion and the flow path forming portion.

2 Claims, 3 Drawing Sheets

DUCT STRUCTURE OF VEHICLE

CROSS REFERENCE TO RELATED APPLICATIONS

This nonprovisional application is based on Japanese Patent Application No. 2023-099873 filed on Jun. 19, 2023 with the Japan Patent Office, the entire contents of which are hereby incorporated by reference.

BACKGROUND

Field

The present disclosure relates to a duct structure of a vehicle.

Description of the Background Art

As a conventional duct structure of a vehicle, Japanese Patent Laying-Open No. No. 2016-117450 discloses a structure in which a sound absorbing member is disposed in an intake duct such that a back space is formed between an inner wall of the intake duct and the sound absorbing member. The liquid that has passed through the sound absorbing member can be stored in the rear space.

SUMMARY

The frequency at which the sound absorbing member easily absorbs sound varies depending on the thickness of the air layer located in the back space. For this reason, in a configuration in which the liquid is stored in the back space as disclosed in Japanese Patent Laying-Open No. 2016-117450, the sound absorbing capability varies depending on the amount of the liquid stored in the back space. As a result, there is a concern that it is difficult to achieve both liquid storage and appropriate sound absorbing capability.

The present disclosure is made in view of the above problem, and it is an object of the present disclosure to provide a duct of a vehicle capable of maintaining appropriate sound absorbing capability while storing liquid.

A duct structure of a vehicle according to the present disclosure includes: a duct disposed upstream of a cooling fan that blows air toward a power storage stack, the duct having an air intake port opening toward an interior of the vehicle; and a sound absorbing member disposed in the duct. The duct has a bottom wall portion. The sound absorbing member is disposed to leave a gap between an inner surface of the bottom wall portion and the sound absorbing member. The inner surface of the bottom wall portion has a portion facing the gap and including a flow path forming portion and a reservoir forming portion, the flow path forming portion forming a flow path portion that allows liquid to flow, the reservoir forming portion forming a reservoir portion where the liquid flowing through the flow path portion is stored. A distance between the reservoir forming portion and the sound absorbing member is larger than a distance between the flow path forming portion and the sound absorbing member. A step is formed between the reservoir forming portion and the flow path forming portion.

In the above configuration, liquid can be stored in the reservoir portion. Further, the step is formed between the flow path forming portion and the reservoir forming portion, which makes it possible to prevent liquid having passed through the flow path portion and stored in the reservoir portion from flowing back to the flow path portion, and prevent the liquid from accumulating in the flow path portion. Accordingly, the thickness of an air layer located in the gap between the flow path forming portion and the sound absorbing member can be kept constant and appropriate sound absorbing capability can be maintained.

In the duct structure according to the present disclosure, a downstream opening of the duct is located downstream of the reservoir portion and opens toward the cooling fan, and the downstream opening may be located at a higher position than the reservoir portion.

In the above configuration, the downstream opening of the duct is located at a higher position than the reservoir portion, which makes it possible to prevent liquid stored in the reservoir portion from entering the cooling fan.

In the duct structure according to the present disclosure, the duct may include a first portion extending in a first direction, and a second portion located downstream of the first portion and extending in a second direction crossing the first direction. The flow path forming portion and the reservoir forming portion may be included in the second portion. The first portion may be provided with the air intake port and an opening that communicates with the second portion. The second portion may have a sidewall portion connecting the flow path forming portion and the opening to each other. The sidewall portion may be provided with a guide portion that guides liquid flowing through the first portion to the flow path forming portion.

In the above configuration, liquid can be guided to the flow path portion by the guide portion, which makes it possible to prevent the liquid from adhering to the sound absorbing member.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
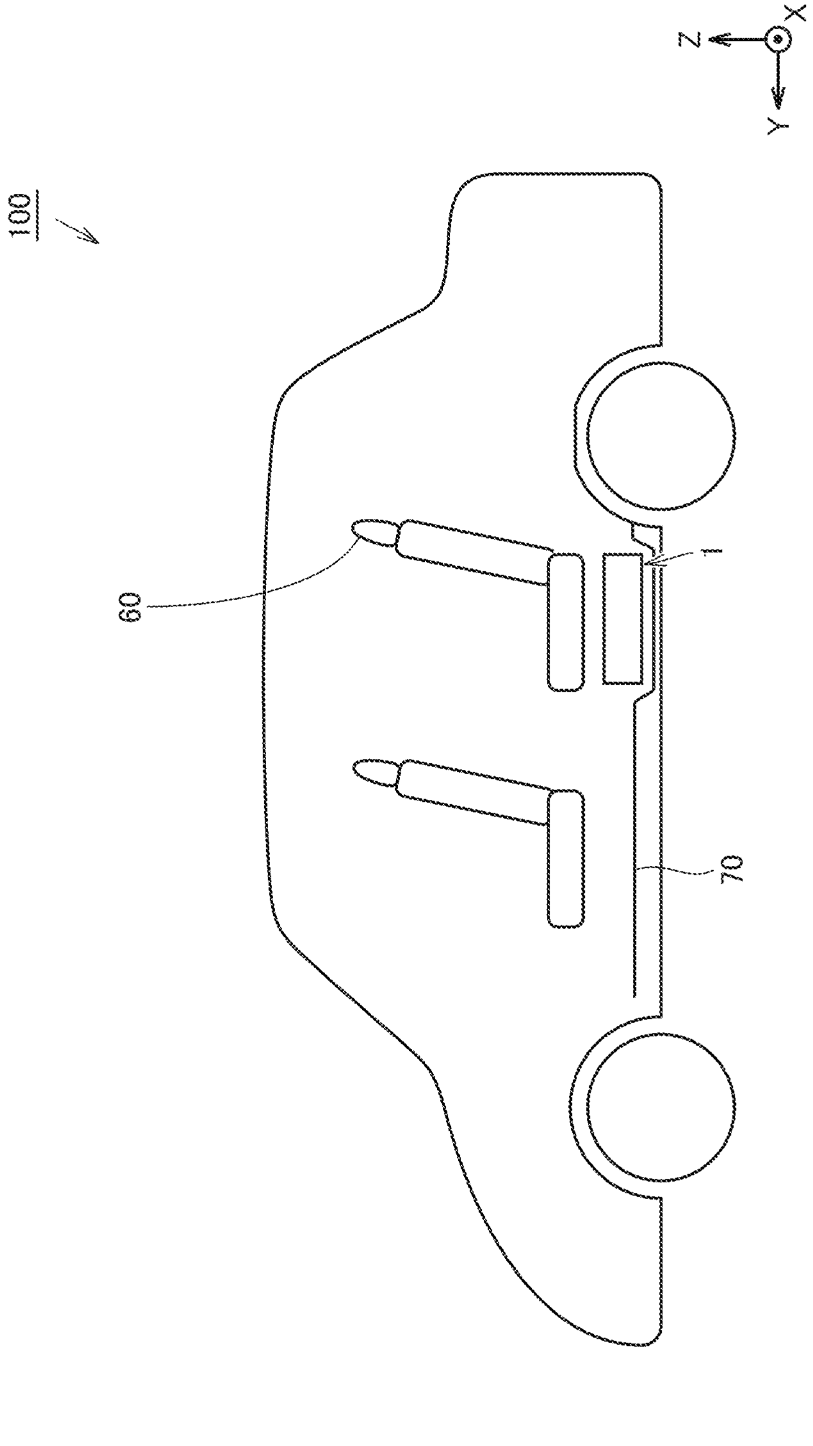
FIG. 1 is a schematic diagram illustrating a vehicle according to an embodiment.

Hereinafter, embodiments of the present disclosure will be described in detail with reference to the drawings. In the following embodiments, the same or common parts are denoted by the same reference numerals in the drawings, and the description thereof will not be repeated. In each of the drawings, the X-axis direction indicates the vehicle width direction, the Y-axis direction indicates the vehicle front-rear direction, and the Z-axis direction indicates the height direction of the vehicle.

FIG. 1 is a schematic diagram illustrating a vehicle according to an embodiment. With reference to FIG. 1, a vehicle 100 according to an embodiment will be described.

The vehicle 100 is, for example, a hybrid electric vehicle that can travel using power of at least one of a motor and an engine, or an electrically powered vehicle that travels using a driving force obtained by electric energy.

Vehicle 100 includes power storage device 1, rear seat 60, and floor panel 70. The power storage device 1 is disposed, for example, below the rear seat 60. More specifically, the power storage device 1 is disposed between the seat cushion of the rear seat 60 and the floor panel 70. Note that the position of the power storage device 1 is not limited to the above, and the power storage device 1 can be disposed as appropriate as long as the power storage device 1 can be cooled using air in the vehicle interior.

Figure 2:
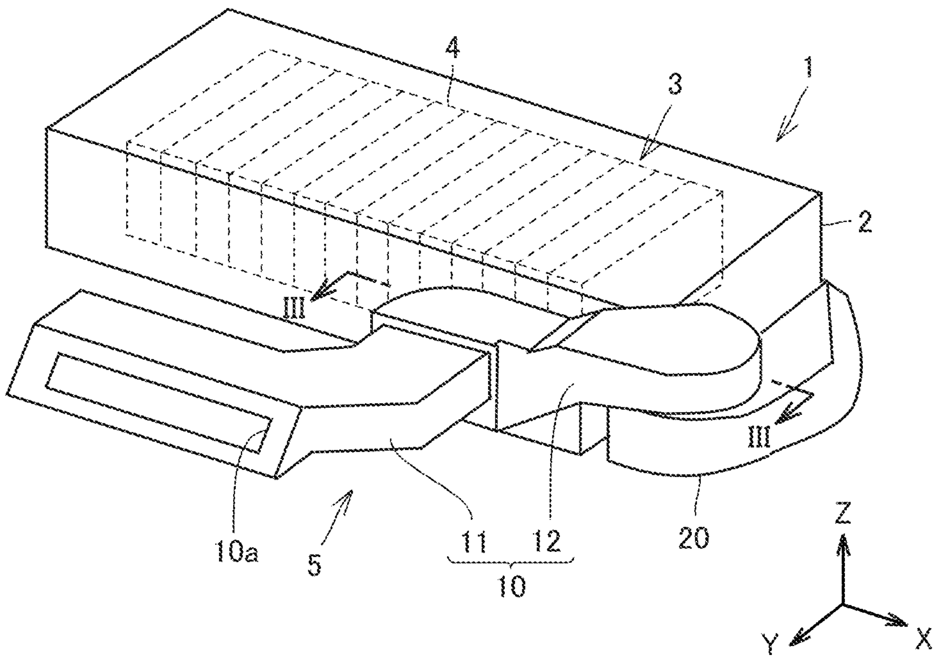
FIG. 2 is a view showing a duct structure and a power storage device of the vehicle according to the embodiment.
Figure 3:
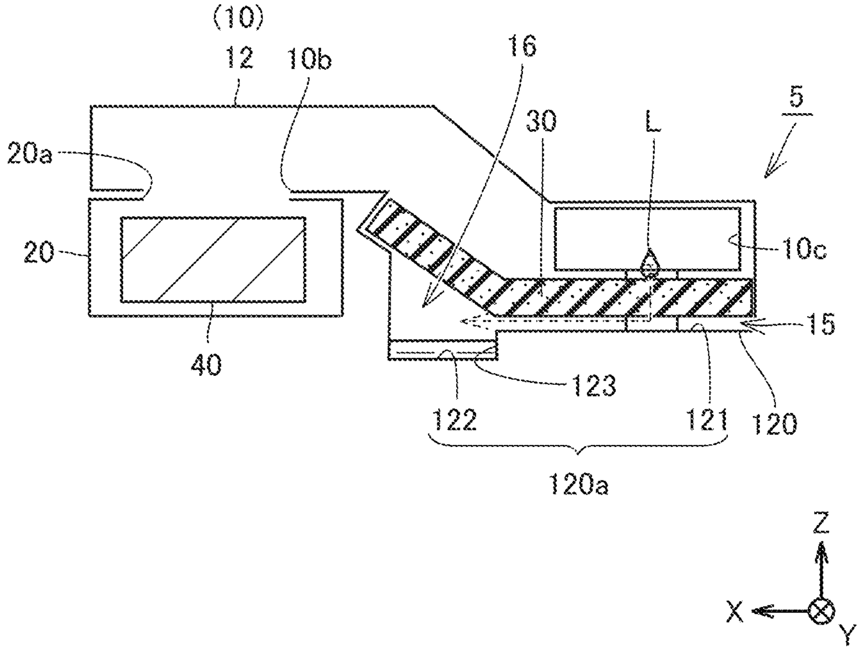
FIG. 3 is a schematic cross-sectional view taken along line III-III shown in FIG. 2.
Figure 4:
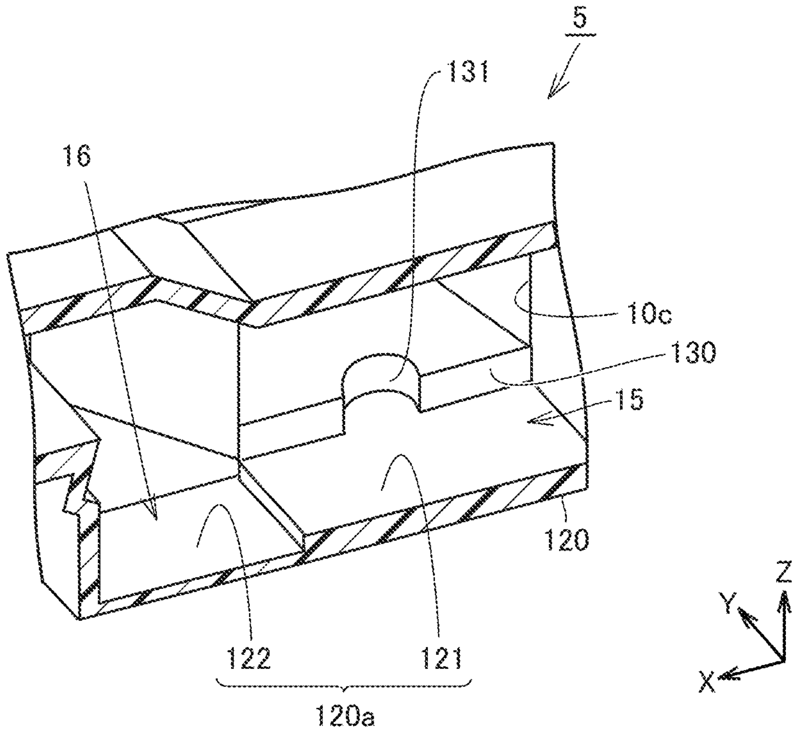
FIG. 4 is a schematic perspective view showing the inside of the duct structure shown in FIG. 2.

FIG. 2 is a view showing a duct structure and a power storage device of the vehicle according to the embodiment. FIG. 3 is a schematic cross-sectional view taken along line III-III shown in FIG. 2. FIG. 4 is a schematic perspective view showing the inside of the duct structure shown in FIG. 2. In FIG. 4, the sound absorbing member 30 is omitted for convenience. The duct structure 5 and the power storage device 1 will be described in detail with reference to FIGS. 2 to 4.

As shown in FIG. 2, the power storage device 1 has a longitudinal shape in the vehicle width direction. The power storage device 1 includes a housing case 2 and a power storage stack 3. The power storage stack 3 is housed in the housing case 2. The power storage stack 3 is configured by arranging a plurality of power storage cells 4 side by side. The plurality of power storage cells 4 are arranged side by side along the vehicle width direction, for example.

The power storage cell 4 is, for example, a secondary battery such as a nickel-metal hydride battery or a lithium ion battery. The power storage cell 4 has, for example, a rectangular shape. The power storage cell 4 may use a liquid electrolyte or a solid electrolyte. The power storage cell 4 may be a unit capacitor configured to be capable of storing power.

As shown in FIGS. 2 to 4, the duct structure 5 includes a first duct 10, a second duct 20, and a sound absorbing member 30.

The second duct 20 is disposed downstream of the first duct 10. The second duct 20 connects the first duct 10 and the power storage device 1. A cooling fan 40 is disposed inside the second duct 20. The cooling fan 40 blows cooling air toward the power storage stack 3. As the cooling fan 40, for example, a sirocco fan or a propeller fan can be employed.

The first duct 10 is disposed on the upstream side of the cooling fan 40, and guides air taken in from the vehicle interior to the cooling fan 40. The first duct 10 includes an air intake port 10*a* that opens toward the vehicle interior, and a downstream opening 10*b* that opens toward the cooling fan 40.

The first duct 10 includes a first portion 11 and a second portion 12. The first portion 11 extends along the first direction. The first direction is, for example, a direction substantially parallel to the front-rear direction of the vehicle. The first portion 11 is provided with an air intake port 10*a* and an opening 10*c* communicating with the second portion 12.

The second portion 12 extends along a second direction intersecting the first direction. The second direction is, for example, a direction substantially parallel to the vehicle width direction. The second portion 12 connects the first portion 11 and the second duct 20. The sound absorbing member 30 is disposed inside the second portion 12. The second portion 12 is provided with the above-described downstream opening 10*b*.

The second portion 12 has a bottom wall portion 120 and a sidewall portion 130. The bottom wall portion 120 faces the sound absorbing member 30. The bottom wall portion 120 is located below the sound absorbing member 30. A gap is formed between the bottom wall portion 120 and the sound absorbing member 30.

The bottom wall portion 120 has an inner surface 120*a*. The inner surface 120*a* includes a flow path forming portion 121 and a reservoir forming portion 122 in a portion facing the gap. The flow path forming portion 121 forms a flow path portion 15 allowing the liquid to flow.

The reservoir forming portion 122 forms a reservoir portion 16 where the liquid flowing through the flow path portion 15 is stored. The downstream opening 10*b* is located higher than the reservoir portion 16.

The reservoir forming portion 122 is disposed on the downstream side of the flow path forming portion 121, and is located at a position lower than the flow path forming portion 121. A step 123 is provided between the reservoir forming portion 122 and the flow path forming portion 121.

The sidewall portion 130 is provided so as to stand upward from an end portion of the flow path forming portion 121 located on the first portion 11 side. The sidewall portion 130 connects the flow path forming portion 121 and the opening 10*c*. The sidewall portion 130 is provided with a guide portion 131 that guides the liquid flowing through the first portion 11 to the flow path forming portion 121. The guide portion 131 is configured by, for example, a recessed portion that is recessed toward the air intake port 10*a* side. Since a gap is formed between the recess and the sound absorbing member 30, the liquid flowing through the first portion 11 can be guided to the flow path forming portion 121 through the gap.

The sound absorbing member 30 is formed of any material having sound absorbing properties. The sound absorbing member 30 may be formed of, for example, an inorganic fiber such as glass wool or rock wool, a metal fiber material such as aluminum fiber, a synthetic resin foam such as a polystyrene resin or a polyethylene resin, a soft material such as urethane or rubber, or a porous material. Further, the sound absorbing member 30 may be constituted by a composite or a stack of various appropriate materials including the above-described materials.

As described above, the sound absorbing member 30 is disposed so as to provide a gap with the inner surface 120*a* of the bottom wall portion 120. Specifically, for example, the sound absorbing member 30 is disposed above the flow path forming portion 121 so as to be substantially parallel to the flow path forming portion 121. The sound absorbing member 30 is disposed above the reservoir forming portion 122 so as to be inclined upward toward the downstream side. The distance between the reservoir forming portion 122 and the sound absorbing member 30 is larger than the distance between the flow path forming portion 121 and the sound absorbing member 30.

As illustrated in FIG. 3, when the liquid L enters the air intake port 10*a* from the vehicle interior or when dew condensation occurs in the duct 10, the liquid L is guided onto the flow path forming portion 121 through the first portion 11. The liquid L guided onto the flow path forming portion 121 passes through the flow path portion 15 formed in the gap between the flow path forming portion 121 and the sound absorbing member 30, is introduced onto the reservoir forming portion 122, and is stored in the reservoir portion 16.

Here, as described above, the step 123 is provided between the flow path forming portion 121 and the reservoir forming portion 122. Therefore, it is possible to suppress backflow of the liquid L from the reservoir portion 16 to the flow path portion 15, and it is possible to suppress accumulation of the liquid in the flow path portion 15. Thus, the thickness of the air layer located in the gap between the flow path forming portion 121 and the sound absorbing member 30 can be kept constant, and appropriate sound absorbing capability can be maintained.

Further, since the downstream opening 10*b* of the first duct 10 is located at a position higher than the reservoir portion 16, it is possible to prevent the liquid L stored in the reservoir portion 16 from entering the cooling fan 40.

In addition, when the liquid L moves from the first portion 11 to the flow path portion 15, the liquid L can be prevented from adhering to the sound absorbing member 30 by guiding the movement by the guide portion 131.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A duct structure of a vehicle, the duct structure comprising:

a duct disposed upstream of a cooling fan that blows air toward a power storage stack, the duct having an air intake port opening toward an interior of the vehicle; and a sound absorbing member disposed in the duct, wherein the duct has a bottom wall portion, the sound absorbing member is disposed to leave a gap between an inner surface of the bottom wall portion and the sound absorbing member, the inner surface of the bottom wall portion has a portion facing the gap and including a flow path forming portion and a reservoir forming portion, the flow path forming portion forming a flow path portion that allows liquid to flow, the reservoir forming portion forming a reservoir portion where liquid flowing through the flow path portion is stored, a distance between the reservoir forming portion and the sound absorbing member is larger than a distance between the flow path forming portion and the sound absorbing member, a step is formed between the reservoir forming portion and the flow path forming portion, the duct includes a first portion extending in a first direction, and a second portion located downstream of the first portion and extending in a second direction crossing the first direction, the flow path forming portion and the reservoir forming portion are included in the second portion, the first portion is provided with the air intake port and an opening that communicates with the second portion, the second portion has a sidewall portion connecting the flow path forming portion and the opening to each other, the sidewall portion is provided with a guide portion that guides liquid flowing through the first portion to the flow path forming portion, and the guide portion is configured by a recessed portion that is recessed toward an air intake port side.

2. The duct structure according to claim 1, wherein a downstream opening of the duct is located downstream of the reservoir portion and opens toward the cooling fan, and the downstream opening is located at a higher position than the reservoir portion.

* * * * *